US010805551B2

(12) United States Patent
Sun et al.

(10) Patent No.: US 10,805,551 B2
(45) Date of Patent: Oct. 13, 2020

(54) METHOD AND DEVICE FOR PHOTOGRAPHING IMAGES

(71) Applicant: BEIJING XIAOMI MOBILE SOFTWARE CO., LTD., Beijing (CN)

(72) Inventors: Heng Sun, Beijing (CN); Zhehong Lin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 8 days.

(21) Appl. No.: 16/178,549

(22) Filed: Nov. 1, 2018

(65) Prior Publication Data
US 2019/0174047 A1    Jun. 6, 2019

(30) Foreign Application Priority Data
Dec. 5, 2017 (CN) .......................... 2017 1 1270472

(51) Int. Cl.
  *H04N 5/235* (2006.01)
  *G03B 7/08* (2014.01)
  *G03B 15/02* (2006.01)
  *G03B 7/17* (2014.01)
  *H04N 5/225* (2006.01)

(52) U.S. Cl.
  CPC ............ *H04N 5/2354* (2013.01); *G03B 7/08* (2013.01); *G03B 7/17* (2015.01); *G03B 15/02* (2013.01); *H04N 5/2256* (2013.01); *H04N 5/2351* (2013.01)

(58) Field of Classification Search
  None
  See application file for complete search history.

(56) References Cited

U.S. PATENT DOCUMENTS

| 2011/0140612 A1* | 6/2011 | Mohan | H05B 47/175 315/149 |
| 2012/0235579 A1* | 9/2012 | Chemel | H05B 37/0245 315/152 |
| 2015/0332349 A1* | 11/2015 | Els | G06Q 30/0275 705/14.71 |
| 2016/0292662 A1 | 10/2016 | Kobayashi et al. | |
| 2016/0360084 A1 | 12/2016 | Zhao | |
| 2019/0037125 A1 | 1/2019 | Jiang et al. | |

FOREIGN PATENT DOCUMENTS

| CN | 102388342 A | 3/2012 |
| CN | 103312986 A | 9/2013 |
| CN | 104113688 A | 10/2014 |

(Continued)

OTHER PUBLICATIONS

OA for EP application 18210368.9 dated Apr. 12, 2019.
OA for CN application 201711270472.9.
OA for CN application 201711270472.9 dated Nov. 1, 2019.

*Primary Examiner* — Quan Pham
(74) *Attorney, Agent, or Firm* — Syncoda LLC; Feng Ma

(57) ABSTRACT

A method for photographing images, applied to a mobile terminal having a source, the method including: obtaining a current ambient light intensity; determining a target luminous intensity based on the current ambient light intensity, wherein the target luminous intensity is a luminous intensity of the light source upon a photographing operation is performed; and controlling the light source to emit light according to the target luminous intensity.

11 Claims, 5 Drawing Sheets

(56) References Cited

FOREIGN PATENT DOCUMENTS

| | | |
|---|---|---|
| CN | 104580892 A | 4/2015 |
| CN | 106791460 A | 5/2017 |
| CN | 106791468 A | 5/2017 |
| CN | 107197164 A | 9/2017 |
| CN | 107277388 A | 10/2017 |
| CN | 107317978 A | 11/2017 |
| WO | 2010093914 A1 | 8/2010 |
| WO | 2015127594 A1 | 9/2015 |

* cited by examiner

METHOD AND DEVICE FOR PHOTOGRAPHING IMAGES

CROSS-REFERENCE TO RELATED APPLICATIONS

This application claims priority to Chinese Patent Application No. 201711270472.9, filed on Dec. 5, 2017, the disclosure of which is incorporated herein by reference in its entirety.

BACKGROUND

Some mobile phones are implemented with a soft light function. For example, when a user takes a "selfie" with a mobile phone, in order to enable less shadow of human face in a photographed image, the mobile phone can turn on a soft light lamp and control a luminous intensity of the soft light lamp as a preset value when detecting a trigger command of a photographing button, and can control to turn off the soft light lamp when detecting that the photographing is finished. The soft light lamp can be separately set on a front surface of the mobile phone, or can be the screen of the mobile phone.

SUMMARY

The present disclosure relates to the field of computer technologies, and more specifically to a method and a device for photographing images.

The inventors of the present disclosure have recognized that, in the related art, since the luminous intensity of the soft light lamp is the preset value, it is possible that the human face is still lack of light, and the human face is relatively dark in the photographed image, resulting in a poor quality of the photographed image.

According to a first aspect of embodiments of the present disclosure, a method for photographing images is provided. The method is applied to a mobile terminal. The mobile terminal is provided with a soft light lamp, and the method includes: obtaining a current ambient light intensity; determining a target luminous intensity according to the current ambient light intensity, in which the target luminous intensity is a luminous intensity of the soft light lamp when photographing operation is performed; and controlling the soft light lamp to emit light according to the target luminous intensity and performing the photographing operation.

According to a second aspect of embodiments of the present disclosure, a device for photographing images is provided. The device is applied to a mobile terminal, the mobile terminal is provided with a soft light lamp, and the device includes: an obtaining module, configured to obtain a current ambient light intensity; a determining module, configured to determine a target luminous intensity according to the current ambient light intensity, in which, the target luminous intensity is a luminous intensity of the soft light lamp when photographing operation is performed; and a controlling module, configured to control the soft light lamp to emit light according to the target luminous intensity and to control performing the photographing operation.

According to a third aspect of embodiments of the present disclosure, a computer readable storage medium is provided. The storage medium is stored with at least one instruction, at least one procedure, a code set or an instruction set, wherein the at least one instruction, the at least one procedure, the code set or the instruction set is configured to be loaded and performed by a processor to implement a method for photographing images according to the first aspect.

According to a fourth aspect of embodiments of the present disclosure, a device for photographing images is provided. The device includes a processor and a memory. The memory is stored with at least one instruction, at least one procedure, a code set or an instruction set, wherein the at least one instruction, the at least one procedure, the code set or the instruction set is configured to be loaded and performed by the processor to implement a method for photographing images according to the first aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

With the above drawings, some embodiments of the present disclosure have been illustrated, which will be described in detail below. These accompanying drawings and textual descriptions are not intended to limit a scope of the present disclosure in any way, but illustrate a concept of the present disclosure for those skilled in the art with reference to specific embodiments.

DETAILED DESCRIPTION

Reference will now be made in detail to some embodiments, examples of which are illustrated in the accompanying drawings. The following description refers to the accompanying drawings in which the same numbers in different accompanying drawings may represent the same or similar elements unless otherwise represented. The implementations described in the following exemplary embodiments do not represent all implementations consistent with the disclosure. Instead, they are merely examples of apparatuses and methods consistent with aspects related to the disclosure as recited in the appended claims.

Embodiments of the present disclosure provide a method for photographing images. An execution subject of the method can be a terminal. The terminal can be a mobile phone, and the terminal can also be provided with a processor or processing circuit, a memory device, a transceiver, a light sensor, an image photographing component, a light source such as a soft light lamp, and the like.

The processor can be configured to process the procedure of photographing images. The memory can be configured to store data required and generated in the following processing procedure. The transceiver can be configured to receive and send messages. The light sensor can be configured to detect the ambient light intensity.

The image photographing component can be a camera, such as a front camera, and can be configured to photograph images. The light source such as the soft light lamp can be separately set in a front surface of the terminal, or can be a display screen of the terminal. The soft light lamp can comprise, for example, a light-emitting diode (LED) light source, such as an organic LED light source. A plurality of LEDs can be included, with adjusted or configurable brightness, color, color temperature, etc., in order to achieve a soft light effect.

The terminal can also include an input/output device such as the screen, the screen can be a touch sensitive screen, and the screen can be configured to display photographed images and the like. A mobile phone can be taken as an example to describe technical solutions in detail.

Figure 1:
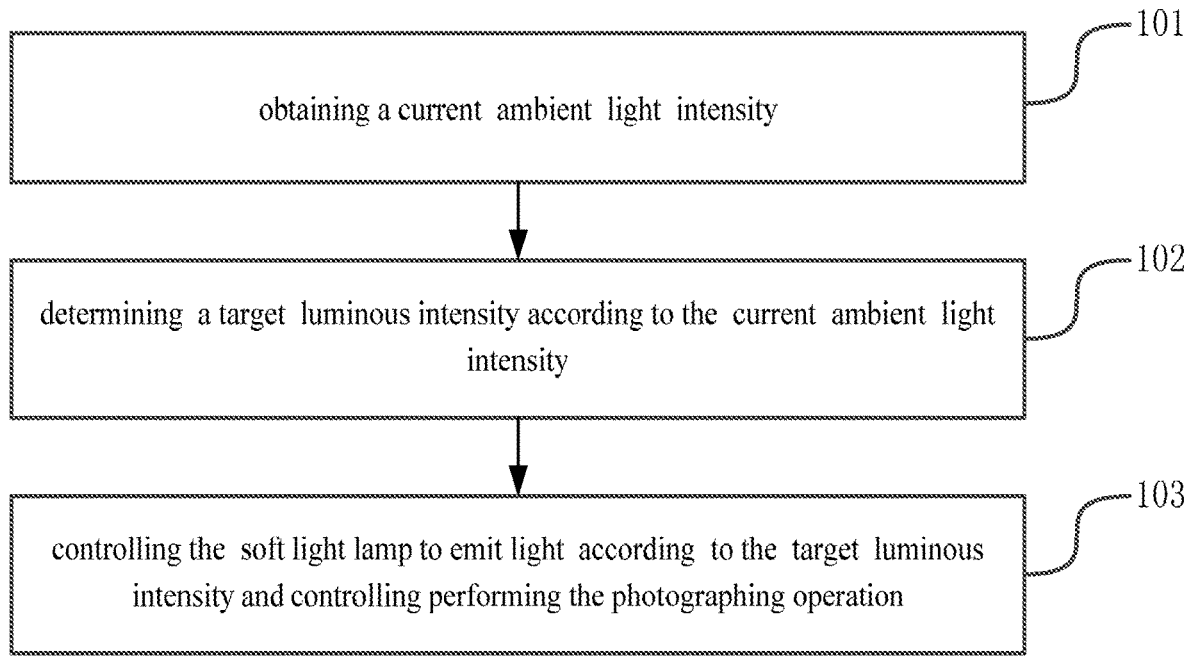
FIG. 1 is a flow chart illustrating a method for photographing images according to some embodiments.

As illustrated in FIG. 1, a method for photographing images can include the following steps.

In step 101, a current ambient light intensity is obtained.

Figure 2:
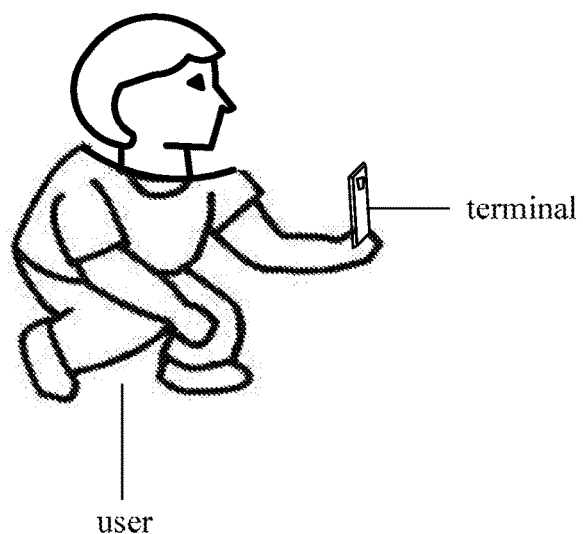
FIG. 2 is a schematic diagram illustrating the photographing of an image according to some embodiments.

In some implementations, as illustrated in FIG. 2, when a user wants to photograph himself/herself with the terminal, the user can trigger the front camera component to turn on, and can adjust an angle of the terminal to find the most appropriate angle for photographing himself/herself. The user can then click a photographing button. The terminal can detect a click instruction of the photographing button, and can control to open the light sensor to detect the current ambient light intensity, or can obtain recorded ambient light intensity.

Alternatively, in some embodiments of the present disclosure, a method for obtaining the current ambient light intensity is further provided, which may include: detecting the ambient light intensity every preset period when a front camera component is detected to be turned on; and obtaining and determining the ambient light intensity detected in a period closest to a current time point as the current ambient light intensity.

The preset period can be preset by a technician, for example, and stored in the terminal. For example, the preset period may be 0.02 s. In some other embodiments, the preset period can be set by the user.

In some implementations, when the terminal detects that the front camera component is turned on, the terminal can turn on the light sensor. Then, the ambient light intensity is detected every preset period, and a time range of each period is recorded. When the terminal detects the click operation of the photographing button, the terminal can determine a current time point, and then determine the ambient light intensity detected in a period closest to the current time point by using the current time point and the time range of each period, and determine the determined ambient light intensity as the current ambient light intensity.

In step 102, a target luminous intensity is determined based on the current ambient light intensity.

The target luminous intensity is the luminous intensity of the soft light lamp when photographing operation is performed, i.e., the luminous intensity of the soft light lamp at the time point when the image is photographed. The soft light lamp can be the screen of the terminal in some embodiments.

Figure 3:
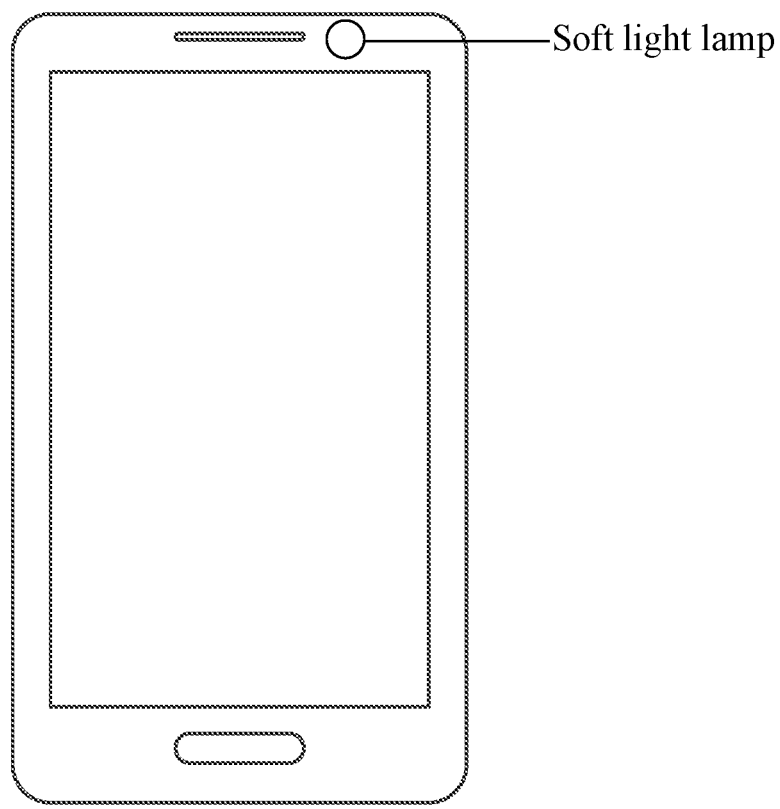
FIG. 3 is a schematic diagram illustrating a soft light lamp according to some embodiments.

As illustrated in FIG. 3, the soft light lamp can also be a lamp provided separately on the front side of the terminal for emitting light according to some embodiments.

In some implementations, after the terminal obtains the current ambient light intensity, the terminal can determine the target luminous intensity by using the current ambient light intensity, which can be achieved by determining the target luminous intensity corresponding to the ambient light intensity according to a pre-stored correspondence relationship between the ambient light intensity and the luminous intensity of the soft light lamp when the photographing operation is performed, or can be achieved by determining the target luminous intensity according to a range of the ambient light intensity. The corresponding processing can be as follows.

The target luminous intensity corresponding to the ambient light intensity range to which the current ambient light intensity belongs is determined according to the pre-stored correspondence relationship between the ambient light intensity range and the luminous intensity of the soft light lamp when the photographing operation is performed.

In some implementations, the correspondence relationship between the ambient light intensity range and the luminous intensity of the soft light lamp when the photographing operation is performed can be preset by the technician, or by the user, and stored in the terminal.

An approach of setting the correspondence relationship by the technician or the user can be, for example: the ambient light intensity is matched with the luminous intensity of the soft light lamp, such that the photographed image has the best quality.

After the terminal determines the current ambient light intensity, the terminal can obtain the pre-stored correspondence relationship between the ambient light intensity range and the luminous intensity of the soft light lamp when the photographing operation is performed, find the ambient light intensity range to which the current ambient light belongs in the correspondence relationship, and then find the luminous intensity of the soft light lamp when the photographing operation is performed corresponding to the found ambient light intensity range in the correspondence relationship, to obtain the target luminous intensity.

In step 103, the soft light lamp is controlled to emit light according to the target luminous intensity and the photographing operation is controlled to perform.

In some implementations, after the terminal determines the target luminous intensity, the terminal can determine an electrical current or power to be applied to the soft light lamp for enabling the luminous intensity of the soft light lamp as the target luminous intensity, and then can control to open the soft light lamp, and apply the determined current or power to the soft light lamp. The terminal can perform the photographing operation, after which, store the photographed images, and control to turn off the soft light lamp, which can reduce the power consumption of the terminal.

Alternatively, when determining the luminous intensity of the soft light lamp, the ambient light intensity can also be used, and the process of the corresponding step 103 can be as follows.

The soft light lamp is controlled to emit light according to the current ambient light intensity and the target luminous intensity.

In some implementations, after the terminal determines the target luminous intensity, the terminal can determine the current applied to the soft light lamp by using the ambient light intensity and the target luminous intensity, and then control to turn on the soft light lamp, and apply the corresponding current to the soft light lamp to enable the soft light lamp to emit light.

Alternatively, when determining the luminous intensity of the soft light lamp, the ambient light intensity can also be used, the corresponding processing of which can be as follows.

An initial luminous intensity of the soft light lamp is determined according to the current ambient light intensity, and the luminous intensity of the soft light lamp is controlled to change from the initial luminous intensity to the target luminous intensity according to a preset rule.

The preset rule is preset by the technician or the user, and stored in the terminal.

In some implementations, after the terminal determines the target luminous intensity, the terminal can use the current ambient light intensity as the initial luminous intensity of the soft light lamp, or can obtain the initial luminous intensity of the soft light lamp by multiplying the current ambient light intensity by a value of less than 1, or can determine the initial luminous intensity of the soft light lamp by subtracting a preset value from the current ambient light intensity.

After determining the luminous intensity of the soft light lamp, the terminal can determine a corresponding first current by using the initial luminous intensity, and determine a second current corresponding to the target luminous intensity.

Next, the terminal can use the preset rule to control the current applied to the soft light lamp to change from the first current to the second current. Therefore, it can realize that the luminous intensity of the soft light lamp changes from the initial luminous intensity to the target luminous intensity. The target luminous intensity is usually greater than the initial luminous intensity, and thus the current or power applied to the soft light lamp is usually controlled to be from low to high. Therefore, eyes of the user can have a process of adaptation, preventing hurting the eyes due to strong light.

Alternatively, in some embodiments of the present disclosure, a method of controlling the soft light lamp to emit light according to the preset rule is provided, the corresponding processes can be as follows.

A preset time difference between detecting a photographing instruction and performing the photographing operation is obtained, a luminous intensity difference of the target luminous intensity and the initial luminous intensity is determined, an adjusting step is determined according to the time difference and the luminous intensity difference, and the luminous intensity of the soft light lamp is controlled to change from the initial luminous intensity to the target luminous intensity according to the adjusting step.

The preset time difference between detecting the photographing instruction and performing photographing operation can be preset by the technician or the user, and stored in the terminal. For example, the preset time difference may be 0.003 s. The time difference refers to a period from detecting the photographing instruction to finishing photographing the image, and may be different for each terminal.

In some implementations, after the terminal determines the initial luminous intensity of the soft light lamp, the terminal can obtain the preset time difference between detecting the photographing instruction and performing photographing operation, and determine the luminous intensity difference between the target luminous intensity and the initial luminous intensity, and then divide the luminous intensity difference by the preset time difference, to obtain the adjusting step.

Next, the terminal determines the first current or power corresponding to the initial luminous intensity, and determines the second current or power when the photographing operation is performed corresponding to the target luminous intensity, and gradually increases the current or power from the first current or power to the second current or power when the photographing operation is performed, and performs the photographing operation at this time, which can make the luminous intensity of the soft light lamp match with the ambient light intensity, and result in a better quality of the photographed image.

In addition, the method of determining the above-mentioned time difference can be as follows according to some embodiments.

Every time when the terminal detects the photographing instruction, it can record the time point at which the photographing instruction is detected this time, and record the time point at which the photographing operation is performed in response to this photographing instruction, and then subtracts the time point when the photographing operation is performed from the time point when the photographing instruction is detected to obtain a time difference, and store the time difference.

Every time after the terminal determines the initial luminous intensity of the soft light lamp, it can obtain the time differences stored in a preset time period before the current time point, and then average the obtained time differences, and determine the average time difference as the preset time difference between detecting the photographing instruction and performing the photographing operation.

Alternatively, the method of determining the above-mentioned time difference can also be as follows according to some embodiments.

Every time when the terminal detects the photographing instruction, it can record the time point at which the photographing instruction is detected this time, and record the time point at which the photographing operation is performed in response to this photographing instruction, and then subtracts the time point when the photographing operation is performed from the time point when the photographing instruction is detected to obtain a time difference, and store the time difference.

Every time after the terminal determines the initial luminous intensity of the soft light lamp, it can obtain a preset number of time differences closest to the current time point, and then obtain a preset number of weights which are preset (a sum of the weights is 1), and allocate the weights to the time differences according to a rule that, the closer to the current time point the time difference is, the greater the weight corresponding to the time difference is, and then obtain the preset time difference between detecting the photographing instruction and performing photographing operation by multiplying each time difference by a corresponding weight and adding the multiplication results together.

In an example, the preset number is 3, the time differences closest to the current time point are A, B and C, and the weights are 0.2, 0.3 and 0.5, and then the preset time difference between detecting the shooting instruction and performing the photographing operation is 0.2*A+0.3*B+0.5*C.

In some embodiments of the present disclosure, the current ambient light intensity is obtained; the target luminous intensity is determined according to the current ambient light intensity, in which the target luminous intensity is a luminous intensity of the soft light lamp when photographing operation is performed; and the soft light lamp is controlled to emit light according to the target luminous intensity and the photographing operation is performed.

Therefore, because the luminous intensity of the soft light lamp is determined based on the ambient light intensity when the photographing operation is performed, the luminous intensity of the soft light lamp can match with environment well, thus making the quality of the photographed image better.

Figure 4:
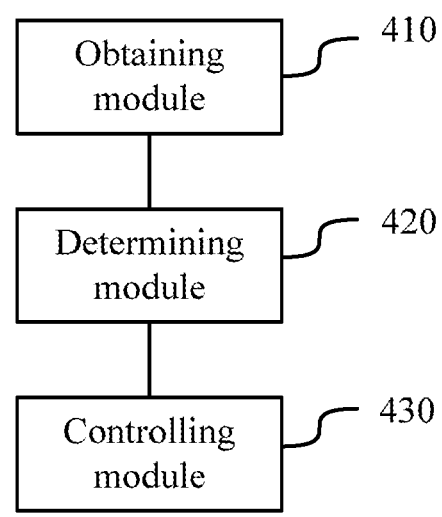
FIG. 4 is a block diagram illustrating a device for photographing images according to some embodiments.

Based on similar principles, some other embodiments of the present disclosure provide a device for photographing images. As illustrated in FIG. 4, the device includes an obtaining module 410, a determining module 420 and a controlling module 430.

The various device components, blocks, or portions may have modular configurations, or are composed of discrete components, but nonetheless may be referred to as "modules" in general. In other words, the "modules" referred to herein may or may not be in modular forms.

The obtaining module 410 is configured to obtain a current ambient light intensity.

The determining module 420 is configured to determine a target luminous intensity according to the current ambient light intensity, in which, the target luminous intensity is a luminous intensity of the soft light lamp when photographing operation is performed.

The controlling module 430 is configured to control the soft light lamp to emit light according to the target luminous intensity, and to control performing the photographing operation.

Figure 5:
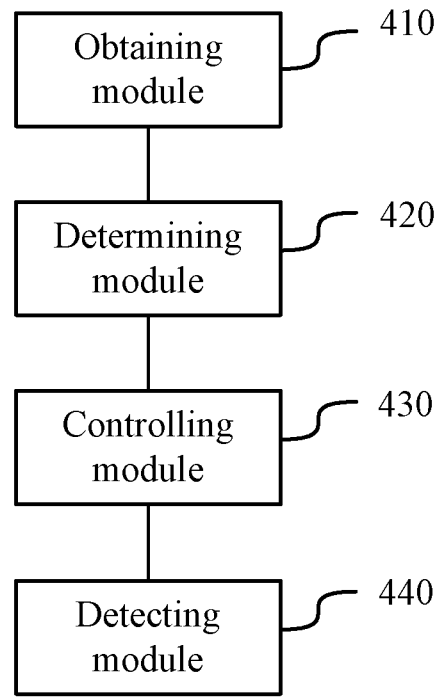
FIG. 5 is a block diagram illustrating a device for photographing images according to some embodiments.

Alternatively, as illustrated in FIG. 5, the device further includes a detecting module 440.

The detecting module 440 is configured to detect the ambient light intensity every preset period when the front camera component is detected to be turned on.

Figure 6:
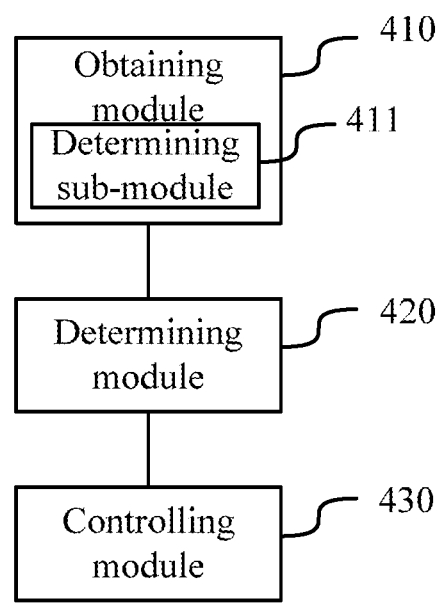
FIG. 6 is a block diagram illustrating a device for photographing images according to some embodiments.

As illustrated in FIG. 6, the obtaining module 410 includes a determining sub-module 411.

The determining sub-module 411 is configured to obtain and determine the ambient light intensity detected in a period closest to a current time point as the current ambient light intensity.

Alternatively, the determining module 420 is configured to determine the target luminous intensity corresponding to the ambient light intensity range to which the current ambient light intensity belongs according to a correspondence relationship between the ambient light intensity range and the light intensity of the soft light lamp when the photographing operation is performed.

Alternatively, the controlling module 430 is configured to control the soft light lamp to emit light according to the current ambient light intensity and the target luminous intensity.

Figure 7:
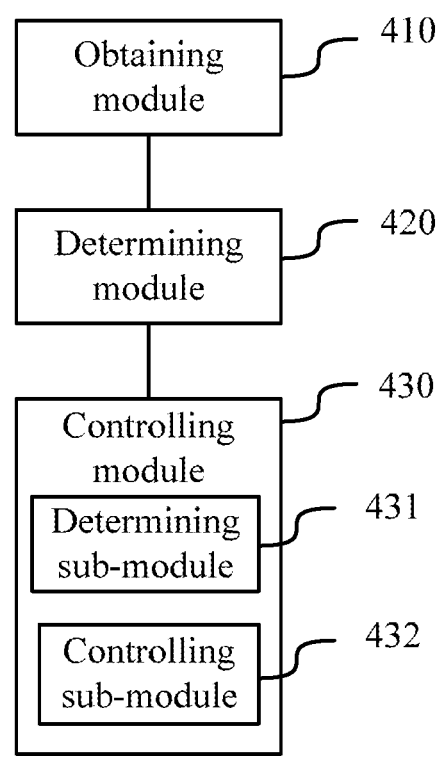
FIG. 7 is a block diagram illustrating a device for photographing images according to some embodiments.

Alternatively, as illustrated in FIG. 7, the controlling module 430 includes a determining sub-module 431 and a controlling sub-module 432.

The determining sub-module 431 is configured to determine an initial luminous intensity of the soft light lamp according to the current ambient light intensity.

The controlling sub-module 432 is configured to control the luminous intensity of the soft light lamp to change from the initial luminous intensity to the target luminous intensity according to a preset rule.

Alternatively, the determining sub-module 431 is configured to determine the initial luminous intensity of the soft light lamp by subtracting a preset value from the current ambient light intensity.

Alternatively, the controlling sub-module 432 is configured to: obtain a preset time difference between detecting a photographing instruction and performing a photographing operation, and determine the luminous intensity difference of the target luminous intensity and the initial luminous intensity; determine an adjusting step according to the luminous intensity difference and time difference; and control the luminous intensity of the soft light lamp to change from the initial luminous intensity to the target luminous intensity according to the adjusting step.

In some embodiments of the present disclosure, the current ambient light intensity is obtained; the target luminous intensity is determined according to the current ambient light intensity, in which the target luminous intensity is a luminous intensity of the soft light lamp when photographing operation is performed; and the soft light lamp is controlled to emit light according to the target luminous intensity and the photographing operation is performed.

Therefore, because the luminous intensity of the soft light lamp is determined based on the ambient light intensity when the photographing operation is performed, the luminous intensity of the soft light lamp can match with environment well, thus making the quality of the photographed image better.

It should be noted that, the device for photographing images provided by the foregoing embodiments are merely illustrative by taking above functional modules as examples. However, in actual application, the foregoing functions can be allocated to different functional modules according to demands. For example, the internal structure of the device can be divided into different functional modules to perform all or part of the functions described above.

In addition, the device for photographing images provided in the foregoing embodiments and the method embodiments of photographing images follow similar principles. Some specific implementations of the processes are described in detailed with reference to the method embodiments, and thus will not be elaborated here.

In some embodiments of the present disclosure, the device can be a terminal. The terminal can be a mobile phone, etc.

Figure 8:
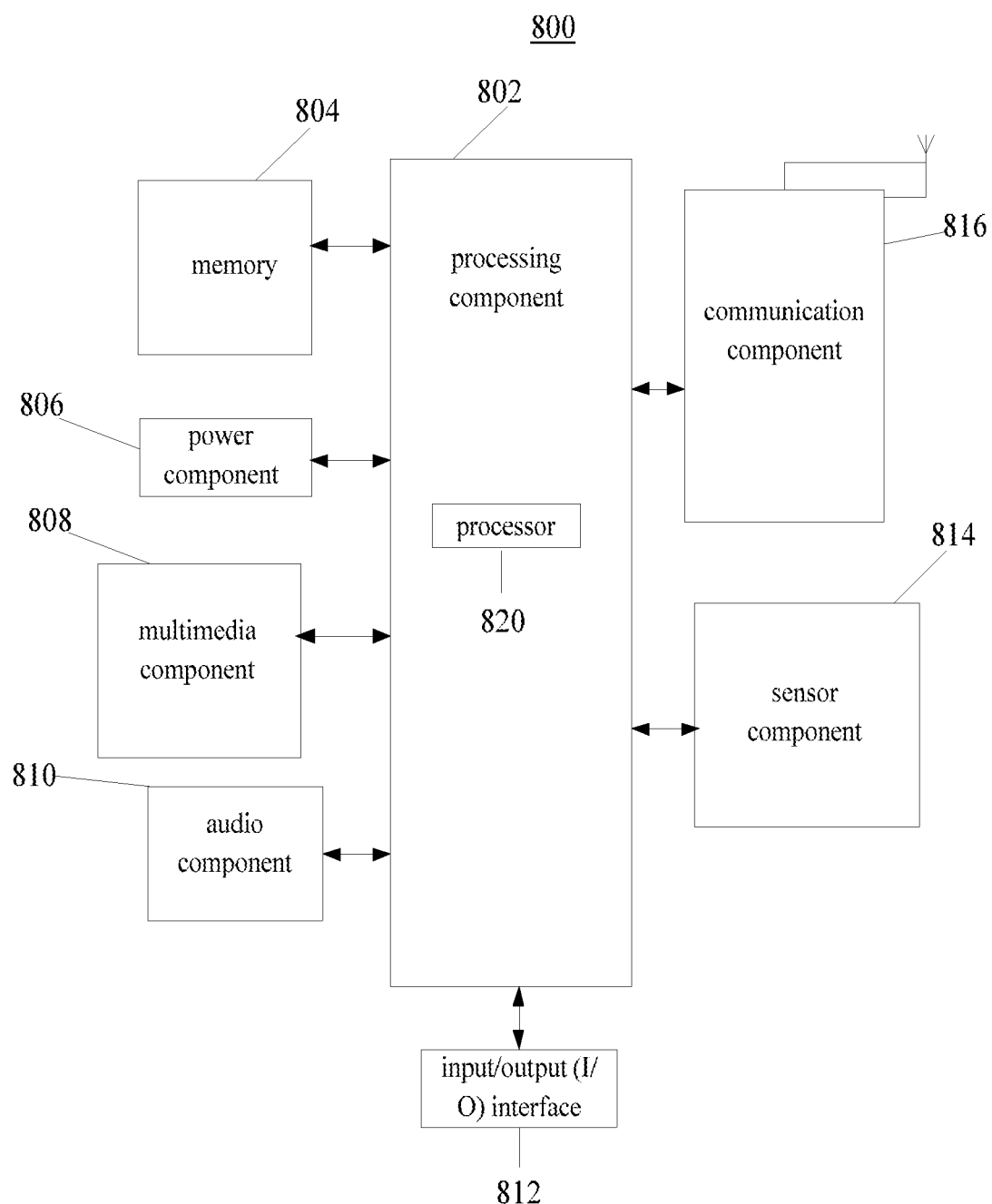
FIG. 8 is a schematic diagram illustrating a terminal according to some embodiments.

With reference to FIG. 8, the terminal 800 may include one or more of the following components: a processing component or processing circuit 802, a memory device 804, a power component 806, a multimedia component 808, an audio component 810, an input/output (I/O) interface 812, a sensor component 814, and a communication component 816.

The processing component 802 can control overall operation of the terminal 800, such as operations associated with display, telephone calls, data communications, camera operations, and recording operations. The processing component 802 may include one or more processors 820 configured to execute instructions, to complete all or part of the operations in the above described methods.

In addition, the processing component 802 may include one or more modules configured to facilitate interactions between the processing component 802 and other components. For instance, the processing component 802 may include a multimedia module to facilitate interaction between the multimedia component 808 and the processing component 802.

The memory 804 can be configured to store various types of data to support operations at the terminal 800. Examples of such data include instructions for any applications or methods operated on the terminal 800, contact data, phonebook data, messages, pictures, videos, etc. The memory 804 may be implemented using any type of volatile or non-volatile storage devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power supplies, and other components related to generation, management, and distribution of power in the terminal 800.

The multimedia component 808 includes a screen that provides an output interface between the terminal 800 and the user. In some embodiments, the screen may include a liquid crystal display (LCD) and a touch panel (TP).

Other types of displays can be employed, such as a light-emitting diode (LED) display, an organic LED (OLED) display, a micro LED (µLED) display, a quantum-dot LED (QLED) display, TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

If the screen includes the touch panel, the screen may be implemented as a touch screen to receive input signals from the user. The touch panel includes one or more touch sensors to sense touches, swipes, and gestures on the touch panel. The touch sensors not only can sense a boundary of a touch or swipe action, but also can sense a duration and a pressure associated with the touch or swipe action.

In some embodiments, the multimedia component 808 includes a front camera and/or a rear camera. When the terminal 800 is in an operation mode, such as a photographing mode or a video mode, the front camera and/or the rear camera may receive external multimedia data. Each of the front and rear cameras may be a fixed optical lens system, or have a focusing and optical zooming capability.

The audio component 810 is configured to output and/or input audio signals. For example, the audio component 810 includes a microphone (MIC) configured to receive an external audio signal when the terminal 800 is in an operating mode, such as a call mode, a recording mode, and a speech recognition mode. The received audio signal may be further stored in the memory 804 or transmitted via the communication component 816.

The I/O interface 812 provides an interface between the processing component 802 and a peripheral interface module, such as a keyboard, a click wheel, a button and the like. The buttons may include, but are not limited to, a home button, a volume button, a starting button, and a locking button.

The sensor component 814 includes one or more sensors configured to provide status assessments of various aspects of the terminal 800. For example, the sensor component 814 may detect an on/off state of the terminal 800, relative positioning of the components, such as the display and the keypad, of the terminal 800, a change in position of the terminal 800 or of a component of the terminal 800, presence or absence of user contact with that terminal 800, an orientation or an acceleration/deceleration of the terminal 800, and a change in temperature of the terminal 800.

The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal 800 and other devices. The terminal 800 can access a wireless network based on a communication standard, such as WiFi, 2G or 3G or a combination of them. In some embodiments, the communication component 816 receives a broadcast signal or broadcast related information from an external broadcast management system via a broadcast channel. In some embodiments, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

Communications between various devices such mobile terminals, and/or between terminals and servers, can be implemented through software or communication apps such as WhatsApp, Snapchat, Skype, WeChat, QQ, or other Internet communication or social media software.

Through the communications, the photographed image can be sent to other devices. In some embodiments, a series of such improved-quality images forming a video can be obtained according to the embodiments described above. Therefore, the "photographing images" referred to various embodiments should be construed broadly to also include taking videos.

In some embodiments, the terminal 800 may be implemented with one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, e.g., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

A computer program (also known as a program, software, software application, script, applications or APP, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

In some embodiments, there is also provided a non-transitory computer readable storage medium including instructions, such as the memory 804 including instructions. The instructions can be executed by the processor 820 of the terminal 800 to perform the methods described above. For example, the non-transitory computer readable storage medium may be a ROM, a random-access memory (RAM), a CD-ROM, a magnetic tape, a floppy disk, an optical data storage device, and the like.

A non-transitory computer readable storage medium includes instructions that, when executed by a processor or processing circuit of a terminal, enable the terminal to perform the method described above, the method including: obtaining a current ambient light intensity; determining a target luminous intensity according to the current ambient light intensity, in which, the target luminous intensity is a luminous intensity of the soft light lamp when photographing operation is performed; controlling the soft light lamp to emit light according to the target luminous intensity and performing the photographing operation.

Alternatively, the method further includes detecting the ambient light intensity every preset period when a front camera component is detected to be turned on, and obtaining the current ambient light intensity includes obtaining and determining the ambient light intensity detected in a period closest to a current time point as the current ambient light intensity.

Alternatively, determining the target luminous intensity according to the current ambient light intensity includes: determining the target luminous intensity corresponding to an ambient light intensity range to which the current ambient light intensity belongs according to a correspondence relationship between the ambient light intensity range and the light intensity of the soft light lamp when the photographing operation is performed.

Alternatively, controlling the soft light lamp to emit light according to the target luminous intensity includes: controlling the soft light lamp to emit light according to the current ambient light intensity and the target luminous intensity.

Alternatively, controlling the soft light lamp to emit light according to the current ambient light intensity and the target luminous intensity includes: determining an initial luminous intensity of the soft light lamp according to the current ambient light intensity; and controlling the luminous intensity of the soft light lamp to change from the initial luminous intensity to the target luminous intensity according to a preset rule.

Alternatively, determining the initial luminous intensity of the soft light lamp according to the current ambient light intensity includes: determining the initial luminous intensity of the soft light lamp by subtracting a preset value from the current ambient light intensity.

Alternatively, controlling the luminous intensity of the soft light lamp to change from the initial luminous intensity to the target luminous intensity according to the preset rule includes: obtaining a preset time difference between detecting a photographing instruction and performing the photographing operation, and determining a luminous intensity difference of the target luminous intensity and the initial luminous intensity; determining an adjusting step according to the luminous intensity difference and the time difference; and controlling the luminous intensity of the soft light lamp to change from the initial luminous intensity to the target luminous intensity according to the adjusting step.

In some embodiments of the present disclosure, the current ambient light intensity is obtained; the target luminous intensity is determined according to the current ambient light intensity, in which the target luminous intensity is a luminous intensity of the soft light lamp when photographing operation is performed; and the soft light lamp is controlled to emit light according to the target luminous intensity and the photographing operation is performed. Therefore, because the luminous intensity of the soft light lamp is determined based on the ambient light intensity when the photographing operation is performed, the luminous intensity of the soft light lamp can match with environment well, thus making the quality of the photographed image better.

Although the foregoing content illustrates exemplary embodiments of the present disclosure, it should be noted that various changes and modifications can be made without departing from the scope of the disclosure as defined by the claims. The functions, steps, and/or acts of the method claims do not need to be performed in any particular order according to disclosed embodiments described herein. Furthermore, although elements of the present disclosure may be described or claimed in an individual form, a plurality can be contemplated unless expressly limited to the singular.

The foregoing specific embodiments further describe the objectives, technical solutions and beneficial effects of the present disclosure in detail, it is to be understood that the foregoing is merely illustrative of specific embodiments of the present disclosure and is not intended to limit the scope of the disclosure, and any modification, equivalent and improvement should be included within the scope of the present disclosure.

The invention claimed is:

1. A method for photographing images, applied to a mobile terminal having a light source, the method comprising:
   obtaining a current ambient light intensity;
   determining a target luminous intensity based on the current ambient light intensity, wherein the target luminous intensity is a luminous intensity of the light source upon a photographing operation is performed;
   determining an initial luminous intensity of the light source by subtracting a preset value from the current ambient light intensity;
   obtaining a preset time difference between detecting a photographing instruction and performing the photographing operation, and determining a luminous intensity difference of the target luminous intensity and the initial luminous intensity;
   determining an adjusting step according to the luminous intensity difference and the time difference; and
   controlling the luminous intensity of the light source to change from the initial luminous intensity to the target luminous intensity according to the adjusting step.

2. The method according to claim 1, further comprising:
   detecting an ambient light intensity during every preset period upon a front camera component being turned on;
   wherein obtaining the current ambient light intensity comprises:

obtaining the ambient light intensity detected in a period closest to a current time point as the current ambient light intensity.

3. The method according to claim 1, wherein the determining the target luminous intensity based on the current ambient light intensity comprises:
determining the target luminous intensity corresponding to an ambient light intensity range to which the current ambient light intensity belongs according to a correspondence relationship between the ambient light intensity range and the luminous intensity of the light source upon the photographing operation being performed.

4. The method according to claim 1, wherein the light source comprises a soft light lamp.

5. The method according to claim 1, wherein the light source comprises a display screen of the mobile terminal.

6. A device comprising:
a light source;
a processing circuit; and
memory configured to store instructions executable by the processing circuit,
wherein the processing circuit is configured to:
obtain a current ambient light intensity;
determine a target luminous intensity based on the current ambient light intensity, wherein the target luminous intensity is a luminous intensity of the light source when a photographing operation is performed;
determine an initial luminous intensity of the light source by subtracting a preset value from the current ambient light intensity;
obtain a present time difference between detecting a photographing instruction and performing the photographing operation, and determine a luminous intensity difference of the target luminous intensity and the initial luminous intensity;
determine an adjusting step according to the luminous intensity difference and time difference; and
control the luminous intensity of the light source to change from the initial luminous intensity to the target luminous intensity according to the adjusting step.

7. The device according to claim 6, wherein the processing circuit is further configured to:
detect an ambient light intensity during every preset period upon a camera being turned on;
obtain the ambient light intensity detected in a period closest to a current time point as the current ambient light intensity.

8. The device according to claim 6, wherein the processing circuit is further configured to:
determine the target luminous intensity corresponding to an ambient light intensity range to which the current ambient light intensity belongs according to a correspondence relationship between the ambient light intensity range and the luminous intensity of the light source when the photographing operation is performed.

9. The device according to claim 6, wherein the light source comprises a soft light lamp.

10. The device according to claim 6, wherein the light source comprises a display screen of the device, and wherein the display screen is configured to be controlled by the processing circuit to realize a soft light output to improve image quality of the photographing operation.

11. A non-transitory computer-readable storage medium having stored thereon instructions configured to be loaded and performed by a processing circuit to implement a method for photographing images, the method comprising:
obtaining a current ambient light intensity;
determining a target luminous intensity according to the current ambient light intensity, wherein the target luminous intensity is a luminous intensity of a light source when photographing operation is performed;
determining an initial luminous intensity of the light source by subtracting a preset value from the current ambient light intensity;
obtaining a preset time difference between detecting a photographing instruction and performing the photographing operation, and determining a luminous intensity difference of the target luminous intensity and the initial luminous intensity;
determining an adjusting step according to the luminous intensity difference and the time difference; and
controlling the luminous intensity of the light source to change from the initial luminous intensity to the target luminous intensity according to the adjusting step.

\* \* \* \* \*